July 19, 1949.     J. BADLAT     2,476,526
MOBILE POWER UNIT AND MOWING DEVICE

Filed Feb. 2, 1946     2 Sheets-Sheet 1

Inventor
James Badlat
Harry L. Yunger
Attorney

Witness
Edward P. Seeby

July 19, 1949. J. BADLAT 2,476,526
MOBILE POWER UNIT AND MOWING DEVICE
Filed Feb. 2, 1946 2 Sheets-Sheet 2

Witness
Edward P. Seeley

Inventor
James Badlat
by Harry L. Yinger.
Attorney

Patented July 19, 1949

2,476,526

UNITED STATES PATENT OFFICE 2,476,526

MOBILE POWER UNIT AND MOWING DEVICE

James Badlat, Des Moines, Iowa

Application February 2, 1946, Serial No. 645,214

13 Claims. (Cl. 56—25.4)

This invention relates to a mobile power unit to which a tool may be affixed and more particularly to a mobile power unit that may be used as a mower, snow plow, rake or sweeper.

For considerable time there has been need for a small power unit for home use which is economical in initial purchase price, easy to operate and adaptable for year round use. There are available large power units for mowing and other uses on a farm that are operated by a person riding on the unit. These of course are too large for home or institution use and further requiring their cost would make their use prohibitive.

It is an object of the invention, among others to provide a small mobile power unit which finds numerous uses around the yard of a house, institution or for light farm work; a movable or mobile power unit that is easy to operate only requiring an operator to guide the power unit; a mobile power unit that is made and arranged to carry a number of different tools to make the mobile power unit adaptable for year round use; a mobile power unit that can be adapted for use as a mower, sweeper, snow plow and rake; a mechanism simple in design, economical to construct and operate, one having a very simple means of being placed in motion and durable in operation. Other objects will become apparent from a detailed description to follow in conjunction with the drawing.

In carrying out the objects of the invention there is provided a mobile power unit having a platform with wheels thereon and a motive power source mounted on the platform. A shaft is rotatably mounted on the platform and the mounting may take the form of a housing member secured to the platform which receives the shaft in suitable bearings with the shaft member extending both above and below the platform. There are means between the motive power source and the shaft to rotate the shaft which may be a V-belt running between the two members with the V-belt situated above the platform. A roller means is attached to the mobile power unit and provides the transmission means for moving the mobile power unit forwardly. The roller is connected to the rotatable shaft by any means and a V-belt has been found satisfactory. The connection is made to the portion of the shaft extending below the platform. There are means on the mobile power unit to place the roller in contact with the surface of the ground to move the mobile power unit which may be in the form of a handle for the operator to grasp in guiding the machine and lower by force to place the roller in contact with the surface of the ground. A spring means is attached to the mobile power unit and roller to pull the roller out of contact with the surface of the ground when the operator removes the downward force from the handle.

The mobile power unit may have a tool attached thereto with the mobile power unit furnishing power to make the tool function. The tool may be a device mounted on the front of the platform and spaced slightly from the surface of the ground to remove any obstruction or obstructions from the path of the mobile power unit in its forward movement and in the present application has been shown as a snow plow and rake.

The mobile power unit may be made into a mower mechanism and a cutting blade is attached to the shaft and is rotatable therewith to cut any weeds or grass coming into the path of the mower mechanism. The cutting blade is adjustable longitudinally on the shaft to leave any length stubble desired after the weeds and grass are cut.

The mobile power unit may be further made into a sweeper mechanism by mounting a rotatable sweeper brush on the sweeper mechanism and a belt is attached to the sweeper and rotatable shaft to rotate the sweeper brush. A spring means is connected between the platform and sweeper brush to hold the sweeper brush out of sweeping position and a means is connected between the handle and sweeper brush to pull the sweeper brush downwardly against the tension in the spring upon a downward movement of the handle.

With the foregoing and other objects in view, the invention will be more fully described hereinafter and will be particularly pointed out in the claims appended hereto.

In the drawings, wherein like symbols refer to like or corresponding parts throughout the several views.

Figure 1:
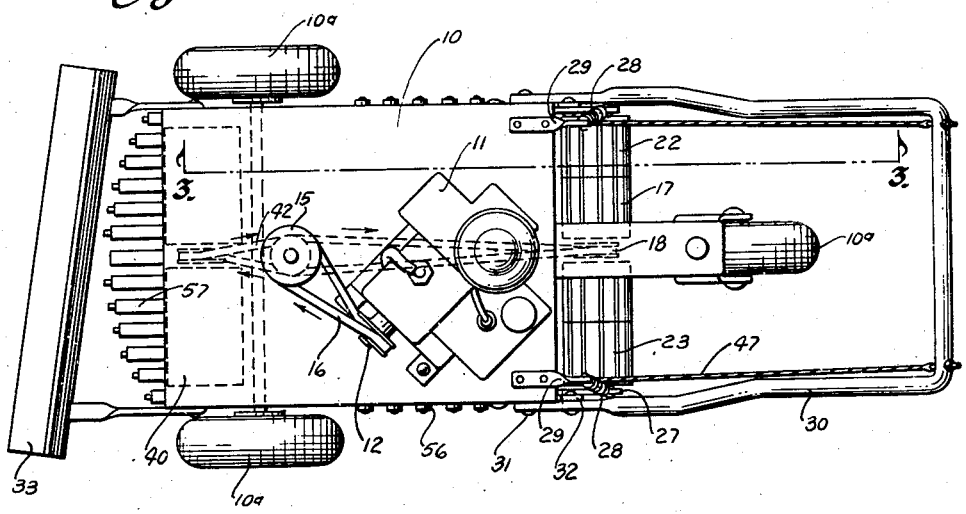
Figure 1 is a plan view of the mobile power unit showing a snow plow attached.
Figure 2:
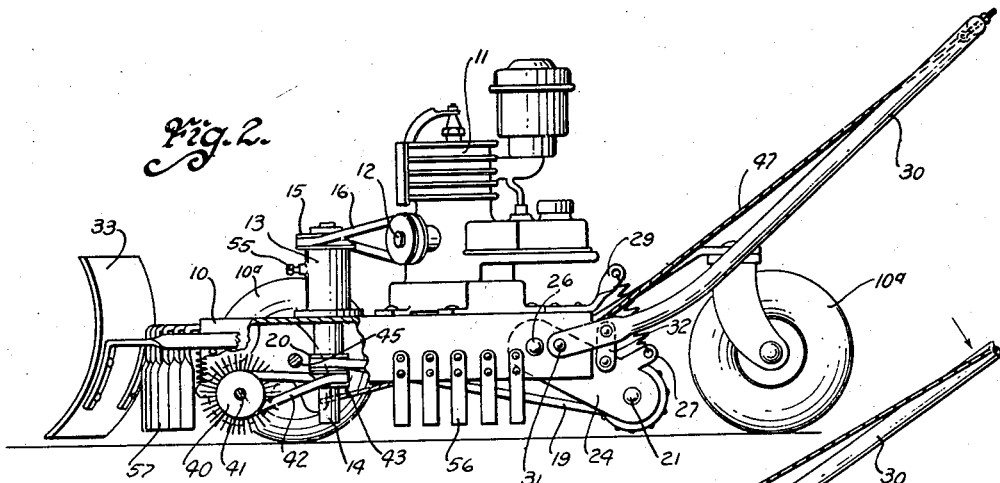
Figure 2 is a side elevational view of the mobile power unit with a portion of the platform broken away to show a sweeper brush attached to the mobile power unit.

The invention is shown as a mobile power unit in Figure 1 to be put to any desirable use and comprises a platform member 10 that can be made in any size desired but applicant has found a platform 26 inches by 16 inches the most desirable since it fits practically all needs for the mobile power unit. The platform can be made of wood, resin or any metal and applicant has used a steel platform very successfully. The platform 10 is mounted on wheels 10a to make the power unit mobile. Any number of wheels may be used and applicant has selected three wheels in the drawing because it makes the power unit more maneuverable in that it is easier for an operator to guide the power unit. The front wheels are supported on a suitable axle keyed to the platform 10 while the rear wheel is supported on an axle in a bracket attached suitably to the platform 10. The wheels found most suitable are 10 inch rubber tired wheels, any number of such type wheel appearing commercially on the market today. Mounted on the platform 10 is a motive power source 11 and secured to the platform 10 in any desirable way with Figures 1 and 2 showing the motive power source bolted to the platform. For a mobile power unit with a platform of the size described, a gasoline motor of ¾ horsepower has been found satisfactory for all uses. This motor is of course a commercial product and applicant lays no claim of novelty to any particular motor. The motor has a pulley 12 to deliver power developed by the motor to a driven means.

A housing 13 is suitably mounted on the platform 10, as by bolts as shown, to rotatably receive a shaft 14 in said housing 13. As can readily be seen, the shaft 14 extends both above and below the platform 10. The shaft 14 is mounted within housing 13 in suitable bearing members (not shown) and is rotatable in the housing 13 by means of a pulley 15 on shaft 14 connecting by means of a V-belt 16 with pulley 12 on the motive power source.

A roller 17 is attached to the platform 10 and is the transmission means for imparting a forward motion to the mobile power unit. The roller 17 has a groove 18 in the center thereof to receive a V-belt 19 which connects with a pulley 20 on the shaft 14 to thus impart a rotary motion to roller 17. The roller 17 is mounted on a suitable axle 21 and has rollers 22 and 23 mounted on axle 21 on either side of roller 17 which rollers 22 and 23 are not rotatable from the motive power source 11. The roller 17 has sufficient width for a frictional contact with the ground that will develop sufficient force to move the power unit forwardly on the surface of the ground and rollers 22 and 23 assist in turning the power unit when a change of direction is desired without tearing up the ground. Axle 21 is mounted in side arms 24 and 25 which are pivoted to the platform 10 as represented at 26 in Figure 2. The arm members 24 and 25 have projections, one of which is represented at 27 in Figure 2, to which one end of a spring 28 is attached while the other end of spring 28 attaches to a bracket 29 fastened to platform 10. Springs 28 hold roller 17 out of contact with the surface of the ground when not in operation.

A handle 30 is pivoted at each side of platform 10 as at 31 and by link members 32 to side arms 24 and 25. Handle member 30 is used by an operator to steer or guide the power unit in motion and by exerting a downward force on the handle, spring 28 is elongated thus putting roller 17 into contact with the surface of the ground. The transmission means is now in operation and the power unit will move forwardly just so long as the operator exerts a force downwardly on handle 30. The force that can be exerted by one finger on handle 30 is sufficient to put the power unit into operation.

The power unit as described up to now is a mobile vehicle which could be put to any use desired. One use found desirable for the mobile power unit is as a snow plow as shown in Figures 1 and 2. A snow plow 33 is attached to the platform 10 and provides an ideal means for removing snow from a sidewalk. As can be noted, roller 17 has projections or cleats to dig in and prevent slipping or skidding, hence sufficient power can be developed to remove or push aside snow.

Figure 3:
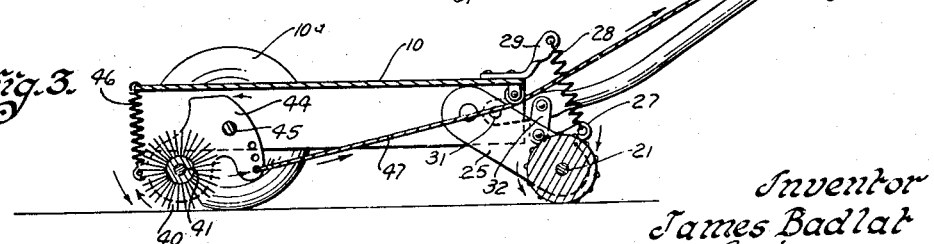
Figure 3 is a sectional view on line 3—3 of Figure 1 of the mobile power unit to show the sweeper brush and roller in contact with the surface of the ground.

Another use to which the power unit can be placed is as a sweeper or a combination snow plow and sweeper arrangement. A brush 40 has a suitable axle 41 about which it rotates by means of V-belt 42 attached to pulley 43 mounted on shaft 14. At each end, brush 40 has its axle 41 mounted in arm members 44, one of which is shown in Figure 3. The arm members 44 are pivotally mounted to the platform 10 as at 45 and the other ends of arm members 44 are attached by springs 46 to platform 10 to hold the brush 40 about one-half inch off the ground when not in operation. A cable member 47 of small diameter, approximately $\frac{1}{16}$ inch, is attached to each arm member 44 and handle 30. Downward movement of handle 30 exerts a pressure on cable 47 which in turn pivots arm members 44 about their pivot point 45 against the tension in spring 46 to bring brush 40 into contact with the surface to be swept. It can thus be seen that brush 40 and roller 17 are brought into contact with the surface of the ground at practically the same time, hence both start into operation at practically the same time. The ends of cable 47 attach into handle 30 by means of a bolt and nut arrangement so the cable 47 can be taken up if any stretch occurs. This renders the cable more or less adjustable to take up slack.

Figure 4:
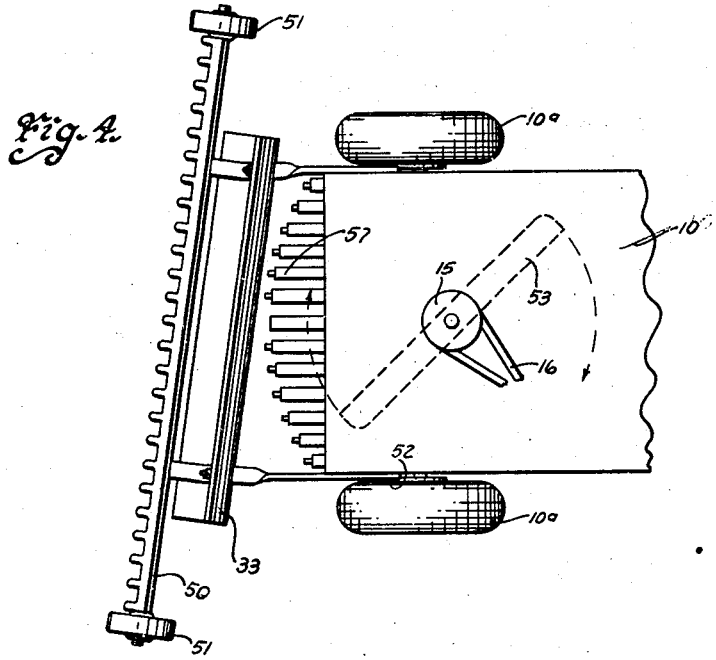
Figure 4 is a front plan view of the mobile power unit shown used as a mower mechanism with rake and snow plow also attached.

In Figure 4, a rake member 50 is shown attached to the snow plow 33 and may be a tool employed with the mobile power unit. The snow plow may be removed from the platform and the rake connected directly to the platform 10. It is a matter of choice and convenience with the operator. The rake is mounted on wheel members 51 which prevent the rake prongs from digging into the earth.

Figure 5:
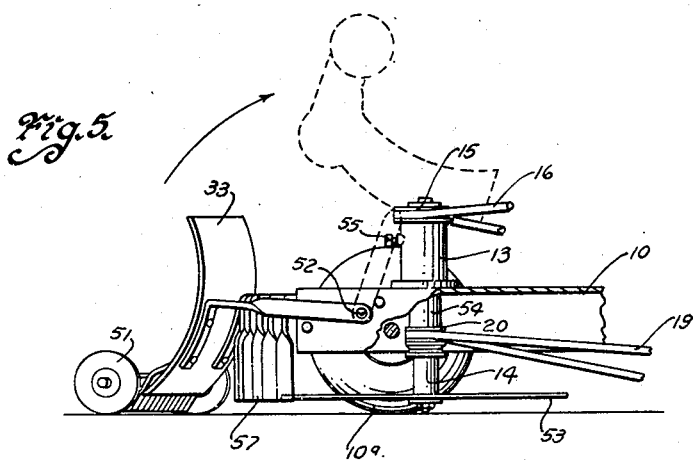
Figure 5 is a side elevational view of Figure 4 with a portion of the platform broken away to show the cutting blade.

Figure 5 shows the mobile power unit used as a mower with snow plow 33 and rake 50 mounted on the platform 10. The rake 50 and snow plow 33 can be pivoted about pivot point 52 and moved into the dotted line position shown in Figure 5, so as to be out of the way for the mowing operation or can be eliminated entirely. Shaft 14 has mounted on the lower end thereof a cutting blade 53 which is keyed to the shaft 14 in any suitable manner and rotates therewith. The cutting blade 53 is made of spring steel and sharpened to present a cutting edge. Housing member 13 has a slidable sleeve 54 which is held in adjusted position by set screw 55 which allows for adjustment of shaft 14 longitudinally, hence controls the height of cutting blade 53 to regulate the length of stubble left when weeds and grass are cut. Guard means 56 are placed on each side of the platform (Figure 2) to protect the whirling cutting blade and also to protect against anyone becoming injured. A rake means 57 is mounted on the front of the platform 10 to serve as a guard means for the blade and to remove obstructions in the path of the mower and prevent the blade being injured. Figure 4 shows clearly the circular path described by cutting blade 53 with relation to the confines of platform 10 and rake 57. The curved end portions on the cutting blade also indicate the sides of the blade that are sharpened.

It can thus be seen that a mobile power unit or vehicle has been presented that can be adapted to many different uses. It is a mobile power unit which could be used to transport articles or could be employed as shown in this application, as a year round implement of home use. A mower in the summer, a rake for the yard in fall, a snow plow in winter and a sweeper for use in any season.

While the invention has been described in connection with several specific embodiments, it is to be understood that the words which have been used are words of description rather than of limitation, and that practice of the invention within the scope of the appended claims may be resorted to without departing from the true scope of the invention in all its aspects.

I claim:

1. A mobile power unit comprising a platform, wheels mounted on the platform, a motive power source on the platform, a housing member on the platform to rotatably receive a shaft member, said shaft extending both above and below the platform, a belt above the platform connecting the motive power source with the shaft to rotate the shaft, a roller means connected with the mobile power unit, a second belt under the platform connecting said roller with that portion of the rotatable shaft under the platform to rotate the roller and means on the mobile power unit to place the roller in contact with the surface of the ground whereby to move the mobile power unit.

2. A mobile power unit comprising a platform, wheels mounted on the platform, a motive power source on the platform, a shaft rotatably mounted on the platform, a belt connecting the motive power source with the shaft to rotate the shaft, a roller means connected with the mobile power unit, a second belt connecting said roller with the rotatable shaft to rotate the roller, a handle connected to the roller which handle places the roller in contact with the surface of the ground when moved downwardly by force, whereby to move the mobile power unit forwardly and a spring means attached to the mobile power unit and roller, to pull the roller out of contact with the surface of the ground when the force is removed from the handle.

3. A mobile power unit comprising a platform, wheels mounted on the platform, a motive power source on the platform, a housing member on the platform to rotatably receive a shaft member, said shaft member extending both above and below the platform, a belt above the platform connecting the motive power source with the shaft to rotate the shaft, a roller means connected with the mobile power unit, a second belt under the platform connecting said roller with that portion of the rotatable shaft under the platform to rotate the roller, a handle connected to the roller which handle places the roller in contact with the surface of the ground when moved downwardly by force, whereby to move the mobile power unit forwardly and a spring means attached to the mobile power unit and roller, to pull the roller out of contact with the surface of the ground when the force is removed from the handle.

4. A mobile power unit comprising a platform, wheels mounted on the platform, a motive power source on the platform, a vertical shaft extending above and below the platform and rotatably mounted on the platform, means connecting the motive power source with the vertical shaft to rotate the shaft, a roller means connected with the mobile power unit, means connecting said roller with the vertical shaft below the platform to rotate the roller and means on the mobile power unit to place the roller in contact with the surface of the ground whereby to move the mobile power unit.

5. A mobile power unit comprising a platform, wheels mounted on the platform, a motive power source on the platform, a vertical shaft extending above and below the platform and rotatably mounted on the platform, a belt connecting the motive power source with the vertical shaft above the platform to rotate the shaft, a roller means connected with the mobile power unit, a second belt connecting said roller with the vertical shaft below the platform to rotate the roller and means on the mobile power unit to place the roller in contact with the surface of the ground whereby to move the mobile power unit.

6. A mobile power unit comprising a platform, wheels mounted on the platform, a motive power source on the platform, a vertical shaft extending above and below the platform and rotatably mounted on the platform, a belt connecting the motive power source with the vertical shaft above the platform to rotate the shaft, a roller means connected with the mobile power unit, a second belt connecting said roller with the vertical shaft below the platform to rotate the roller and a handle movably connected to the platform and roller to place the roller into contact with the surface of the ground when the handle is moved downwardly.

7. A mower comprising a platform, wheels mounted on the platform, a motive power source on the platform, a vertical shaft extending above and below the platform and rotatably mounted on the platform, means connecting the motive power source with the vertical shaft to rotate the shaft, a roller means connected with the mower, means connecting said roller with the vertical shaft below the platform to rotate the roller, means on the mower to place the roller in contact with the surface of the ground whereby to move the mower and a cutting blade attached to the end of the shaft below the platform and rotatable with the shaft.

8. A mower comprising a platform, wheels mounted on the platform, a motive power source on the platform, a vertical shaft extending above and below the platform and rotatably mounted on the platform, a belt connecting the motive power source with the vertical shaft above the platform to rotate the shaft, a roller means connected with the mower, a second belt connecting said roller with the vertical shaft below the platform to rotate the roller, means on the mower to place the roller in contact with the surface of the ground whereby to move the mower and a cutting blade attached to the end of the shaft below the platform and rotatable with the shaft.

9. A mower comprising a platform, wheels mounted on the platform, a motive power source on the platform, a housing member on the platform to rotatably receive a shaft member, said shaft extending both above and below the platform, a belt above the platform connecting the motive power source with the shaft to rotate the shaft, a roller means connected with the mower, a second belt under the platform connecting said roller with that portion of the rotatable shaft under the platform to rotate the roller, means on the mower to place the roller in contact with the surface of the ground whereby to move the mower and a cutting blade attached to the end of the shaft below the platform and rotatable with the shaft.

10. A mobile mechanism comprising a platform, wheels mounted on the platform, a motive power source on the platform, a vertical shaft extending above and below the platform and rotatably mounted on the platform, a belt connecting the motive power source with the vertical shaft above the platform to rotate the shaft, a roller means connected with the mower, a second belt connecting said roller with the vertical shaft below the platform to rotate the roller, a handle movably connected to the platform and roller to place the roller into contact with the surface of the ground when the handle is moved downwardly and a cutting blade attached to the end of the shaft below the platform and rotatable with the shaft.

11. A mower comprising a platform, wheels mounted on the platform, a motive power source on the platform, a shaft rotatably mounted on the platform, a belt connecting the motive power source with the shaft to rotate the shaft, a roller means connected with the mower, a second belt connecting said roller with the rotatable shaft to rotate the roller, a handle connected to the roller which handle places the roller in contact with the surface of the ground when moved downwardly by force whereby to move the mower forwardly, a spring means attached to the mower and roller, to pull the roller out of contact with the surface of the ground when the force is removed from the handle and a cutting blade attached to the end of the shaft below the platform and rotatable with the shaft.

12. A mower comprising a platform, wheels mounted on the platform, a motive power source on the platform, a housing member on the platform to rotatably receive a shaft member, said shaft member extending both above and below the platform, a belt above the platform connecting the motive power source with the shaft to rotate the shaft, a roller means connected with the mower, a second belt under the platform connecting said roller with that portion of the rotatable shaft under the platform to rotate the roller, a handle connected to the roller which handle places the roller in contact with the surface of the ground when moved downwardly by force whereby to move the mower forwardly, a spring attached to the mower and roller, to pull the roller out of contact with the surface of the ground when the force is removed from the handle and a cutting blade attached to the end of the shaft below the platform and rotatable with the shaft.

13. A mower comprising a platform, wheels mounted on the platform, a motive power source on the platform, a housing member on the platform to rotatably receive a shaft member, said shaft member extending both above and below the platform, a belt above the platform connecting the motive power source with the shaft to rotate the shaft, a roller means connected with the mower, a second belt under the platform connecting said roller with that portion of the rotatable shaft under the platform to rotate the roller, a handle connected to the roller which handle places the roller in contact with the surface of the ground when moved downwardly by force whereby to move the mower forwardly, a spring attached to the mower and roller, to pull the roller out of contact with the surface of the ground when the force is removed from the handle and said shaft and cutting blade being vertically adjustable in the housing.

JAMES BADLAT.

REFERENCES CITED

The following references are of record in the file of this patent:

UNITED STATES PATENTS

| Number | Name | Date |
| --- | --- | --- |
| 445,219 | Briggs | Jan. 27, 1891 |
| 961,485 | Dale et al. | June 14, 1910 |
| 1,028,063 | Ruch | May 28, 1912 |
| 1,275,851 | Comfort | Aug. 13, 1918 |
| 1,383,178 | Voges | June 28, 1921 |
| 1,424,878 | Canfield | Aug. 8, 1922 |
| 1,550,780 | Cerasoli | Aug. 25, 1925 |
| 1,563,975 | Goeringer | Dec. 1, 1925 |
| 1,904,881 | Presbrey | Apr. 18, 1933 |
| 2,055,011 | Hough | Sept. 22, 1936 |
| 2,066,174 | Cregier | Dec. 29, 1936 |
| 2,134,115 | Flammang | Oct. 25, 1938 |
| 2,194,297 | Drumm | Mar. 19, 1940 |
| 2,243,133 | Steiner et al. | May 27, 1941 |
| 2,282,837 | Wahrenbrock | May 12, 1942 |

FOREIGN PATENTS

| Number | Country | Date |
| --- | --- | --- |
| 539,091 | France | Mar. 28, 1922 |